(No Model.)

S. B. REID.
TONGUE SUPPORT.

No. 300,798. Patented June 24, 1884.

Witnesses.
John A. Hasecoster
L. Rinsyn

Inventor.
Sylvester B. Reid
By Pettis A. Reid
Attorney

UNITED STATES PATENT OFFICE.

SYLVESTER B. REID, OF WILEY'S STATION, OHIO.

TONGUE-SUPPORT.

SPECIFICATION forming part of Letters Patent No. 300,798, dated June 24, 1884.

Application filed March 19, 1884. (No model.)

*To all whom it may concern:*

Be it known that I, SYLVESTER B. REID, a citizen of the United States, residing at Wiley's Station, in the county of Darke and State of Ohio, have invented a new and useful machine for supporting the tongue of all vehicles or tools having a said tongue when said vehicles or tools are not in motion, of which the following is a specification.

The object of my invention is—

(a) To relieve the hounds of a wagon or of any similarly-constructed truck or vehicle of any strain caused by the leverage of the tongue by attaching my invention to the under surface of the tongue and manipulating as stated further on in this specification.

(b) To relieve horses or other animals similarly placed of any weight on their necks communicated by the tongue or of the weight of the tongue of any vehicle or tool when not in motion. It is the case with many farm-tools—such as self-binders, reapers, mowers, drills, cultivators, and others—that when in motion there is little or no weight communicated to the horses' or other animals' necks by the tongue because of the driver's position or of the peculiar hitching apparatus on said farm-tools; but when said farm-tools are not in motion and the driver not in his position there is more or less weight communicated to said horses' or other animals' necks by the tongue, often causing said horses or other animals much exhaustion and pain, all of which my invention obviates when attached to the under surface of said tongue and manipulated as stated in this specification.

(c) To support the tongue of a vehicle or tool when not in use, thereby preventing said tongue being soiled or damaged by mud or water, or by animals running at large about said vehicle or tool, to be accomplished as described in the preceding paragraph.

Figure 1:
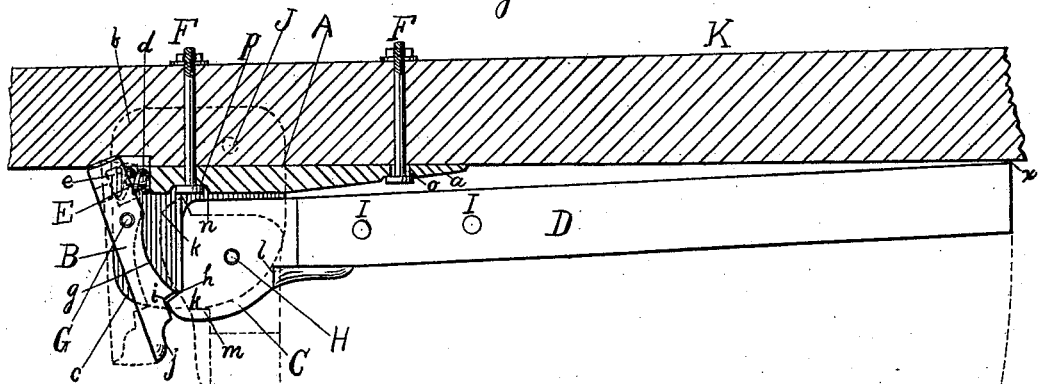
Figure 2:
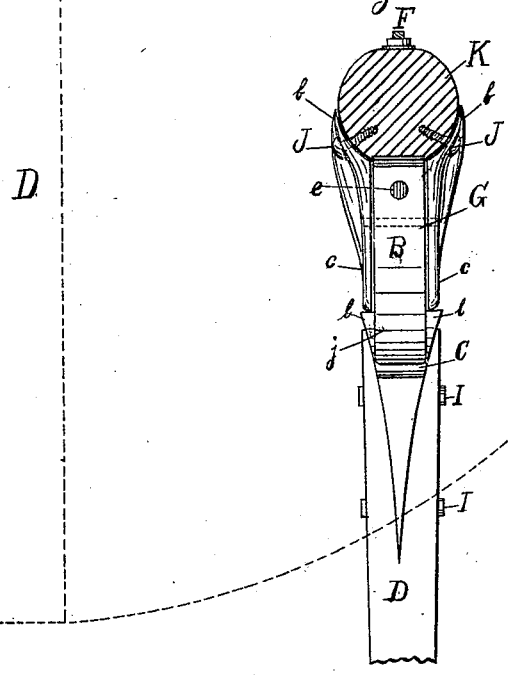

Figure 1 is a sectional side view of a tongue-support embracing the main features of my invention. Fig. 2 is a front view of a tongue-support, showing the manner of fitting and attaching the same, not clearly shown in Fig. 1.

In the drawings, the flanges b b, jaws c c, Fig. 2, shaft a, and guide d, Fig. 1, constitute one solid or whole piece—namely, the tongue-connection A.

B denotes the trip-latch; C, the staff-connection; D, the staff; E, a spiral spring; F F, fastening devices; G and H, pivotal bolts or rivets, and K the tongue.

The tongue-support is to be made rigid to the under surface of the tongue K at any point of its entire length by means of a bolt or screw, F, through the lateral slot o, which permits of a side adjustment of the staff D, and by the bolt or screw F, the head of which is countersunk into the shaft a at n, and also by screws or bolts through the flanges b b at J J, Fig. 2. The upper faces of said flanges b b, Fig. 2, to be in the plane of the upper face of the shaft a, or at any angle between zero and ninety degrees to said plane, Fig. 1, or the upper faces of said flanges b b to be curved, Fig. 2.

The staff-connection C is held within the jaws c c by the pivotal bolt or rivet H, and is formed with a latch, k, Fig. 1, and shoulders l l, Fig. 2. To the staff-connection C is made fast the staff D by the usual method, Fig. 1.

The trip-latch B is held within the jaws c c by the pivotal bolt or rivet G. The spiral spring E is placed loosely within the circular recess e, and said spiral spring E is kept in the recess e by the guide d, Fig. 1. The trip-latch B is formed with a curved face at g, a latch, i, and trigger j, Fig. 1.

By examining the drawings it will be seen that my invention, to act successfully as a tongue-support, must have a greater distance from the upper face of the shaft a to the lower end of the staff D in the perpendicular position than from the face of the tongue K adjoining the upper face of the shaft a to the ground when said tongue K is unsupported. Now, from the above description, and by examining Fig. 1, it will be seen that when the tongue K is raised and held above its unsupported position and the trip-latch B is pulled clear of the latch k the staff D will fall by the law of gravitation from the oblique to a position perpendicular to the plane of the upper face of the shaft a, as shown by the dotted staff D, Fig. 1, and the staff D will be prevented from passing said perpendicular position by the shoulders l l, Fig. 2, striking the lower edges of the flanges or jaws c c at m, Fig. 1. Now, if the tongue K be lowered until the base of the staff D comes in contact with the ground, it will be firmly supported by said tongue-support. Conversely, if the tongue K be raised until the lower end or base of the staff D be clear of the ground, and said staff D be pushed back from said perpendicular to an oblique position until the base of the staff D comes in contact with the tongue K at $x$, it will be seen that while the staff D is passing from said perpendicular to the oblique position the latch $k$ will strike the trip-latch B at $g$ and force it backward until the latch $k$ passes the latch $h$. Then the spiral spring E, relieved of all pressure, forces the latch $h$ past the latch $k$ until the latch $k$ rests closely within the angle at $i$, Fig. 1. Hence it will be seen that the staff D and staff-connection C coming in contact with the tongue K at $x$ and the trip-latch B at $h$ at the same time, all rattling or unnecessary noise is obviated while the vehicle or tool is in motion; and, furthermore, it will be seen that when in the position just described the tongue-support will not interfere with the locomotion of the animals attached to the vehicle or tool, and not very liable to damage by the tongue K coming in contact with obstructions.

Having thus described my invention, I claim as new and desire to secure by Letters Patent—

A tongue-support constructed substantially as herein shown and described, consisting of the tongue-connection A, in combination with the spiral spring E, trip-latch B, staff-connection C, staff D, and fastening devices F F and J J, connected as set forth.

SYLVESTER B. REID.

Witnesses:
SOLOMON FAX,
DICK RAILSBACK.